United States Patent
Jones et al.

(10) Patent No.: US 6,646,795 B1
(45) Date of Patent: Nov. 11, 2003

(54) OPTICAL AMPLIFIER

(75) Inventors: Kevan P Jones, Totnes (GB); Ian P McClean, Brixham (GB)

(73) Assignee: Nortel Networks Limited, St. Laurent (CA)

(*) Notice: Subject to any disclaimer, the term of this patent is extended or adjusted under 35 U.S.C. 154(b) by 34 days.

(21) Appl. No.: 09/716,589

(22) Filed: Nov. 20, 2000

(51) Int. Cl.$^7$ ................................................. H01S 3/00
(52) U.S. Cl. ..................................... 359/349; 359/337.1
(58) Field of Search .......................... 359/337.1, 337.2, 359/341.41, 341.42, 484, 494, 495, 497, 498, 349

(56) References Cited

U.S. PATENT DOCUMENTS

| | | | | |
|---|---|---|---|---|
| 5,867,300 A | * | 2/1999 | Onaka et al. ............... | 359/283 |
| 5,880,874 A | * | 3/1999 | Shibuya et al. ............ | 359/337 |
| 5,900,970 A | * | 5/1999 | Kakui ....................... | 359/341 |
| 6,018,412 A | * | 1/2000 | Fukushima ................. | 359/283 |
| 6,049,416 A | * | 4/2000 | Srivastava et al. ......... | 359/341 |
| 6,049,418 A | * | 4/2000 | Srivastava et al. ......... | 359/341 |
| 6,081,367 A | * | 6/2000 | Yokoyama et al. ......... | 359/341 |
| 6,246,513 B1 | * | 6/2001 | Bayart et al. .............. | 359/341 |
| 6,259,555 B1 | | 7/2001 | Meli et al. ................. | 359/337 |
| 6,268,955 B1 | * | 7/2001 | Shimojoh et al. ......... | 359/337.2 |
| 6,307,668 B1 | * | 10/2001 | Bastien et al. ............ | 359/337.1 |
| 6,339,492 B1 | * | 1/2002 | Terahara et al. ............ | 359/283 |
| 6,452,718 B1 | | 9/2002 | Augustsson ............... | 359/337.1 |

FOREIGN PATENT DOCUMENTS

| | | | | |
|---|---|---|---|---|
| JP | 411271700 A | * | 10/1999 | ............. G02F/1/09 |

OTHER PUBLICATIONS

"Tunable Gain Equalization Using a Mach–Zehnder Optical Filter in Multistage Fiber Amplifiers", Kyo Inoue et al., IEEE Photonics Technology Letters, vol 3, No. 8, 8/91, pp 718–720.

"Ultra–Wide Dynamic Range Erbium Doped Fiber Amplifiers Employing Variable Attenuation Slope Compensator", H. Nakaji et al., OWA2–1, pp 167–169. OAA. 2000.

"Variable attenuation slope compensator (VASC) using silica–based planar lightwave circuit technology for active gain slope control in EDFAs", Hitoshi Hatayama et al., 4pp. OFC 2000.

"Compensation of L–band Gain–Wavelength Characteristics Using Linear and Second–order Variable Gain Equalizers", Naomasa Shimojoh et al., OWA3–1, pp170–172, OAA 2000.

Low–loss polarisation–independent dynamic gain–equalisation filter, Steven Frisken et al., WM 14, pp1–4. Mar. 8, 2000.

* cited by examiner

Primary Examiner—Thomas G. Black
Assistant Examiner—Deandra Hughes
(74) Attorney, Agent, or Firm—Barnes & Thornburg

(57) ABSTRACT

An optical amplifier for amplifying the channel signals of a WDM signal comprises an amplifier arrangement for amplifying a band of the channels. The amplifier arrangement comprises an amplifier (6) and a filter (8). The filter comprises a controllable optical filter having an attenuation characteristic which comprises a region of positive gradient and a region of negative gradient with respect to input frequency. The magnitude and alignment along the frequency axis of the attenuation characteristic is variable, such that the filter can be tuned to provide gain flattening for the amplified band of channels. The filter can be tuned to the requirements of a particular sub-band, whilst identical filters can be used for each sub-band. This invention enables identical filters to be used, and gives good pump power efficiency, as the attenuation of each filter can be controlled to the desired level, thereby avoiding the need for large increases in pump power.

18 Claims, 10 Drawing Sheets

OPTICAL AMPLIFIER

FIELD OF THE INVENTION

This invention relates to amplification of signals in multi channel optical communications systems, and in particular to the amplification of groups of WDM channels within a WDM optical communications network.

BACKGROUND OF THE INVENTION

Amplifiers, such as Erbium doped fiber amplifiers, are widely used in optical communications systems, in order to compensate for fiber and splitting losses within the system. The gain response of these amplifiers is wavelength dependent, so that if an amplifier is used for all channels, different channels are amplified with different levels of gain. The wavelength dependency also depends on the gain setting of the amplifier. Gain control schemes typically analyse the average power over the full range of channels, so do not provide gain control on an individual channel basis. Instead, gain flattening filters are used in an attempt to bring the signal intensity to the same level for all channels.

It has also been proposed to provide individual amplifiers for groups of channels, known as sub-bands. This enables dispersion compensation and power management to be designed for each sub-band. These sub-bands are typically used at multiplexing and demultiplexing sites, where the sub-bands exist as an intermediate level of multiplexing between the fiber and the individual channels. Thus, sub-bands may be employed at transmit and receive nodes, as well as at add-drop sites.

The amplification of sub-bands enables the gain flatness to be controlled more accurately across that group of channels. Different gain settings can then also be applied to different amplifiers, to achieve gain flatness across the different groups of channels. In a practical implementation, a variable optical attenuator can be associated with each amplifier. However, the losses of the VOA result in the amplifiers being pump power inefficient, and the achievable noise figure of the amplifier is degraded. Each amplifier is associated with a dedicated gain flattening filter, and a problem with this approach is the expense of providing different fixed filters for each sub-band.

A further alternative is to use identical filters for the gain flattening of each sub-band. To enable this, the filter needs to have a loss characteristic which maps the amplifier characteristics across the full channel spectrum. This inevitably results in the filter imposing more loss on some bands of channels than would be the case with a dedicated filter. The use of a single filter design thus reduces the implementation cost, but at the expense of reduced pump power efficiency.

There is therefore a need for an efficient and low cost gain flattened amplifier design.

SUMMARY OF THE INVENTION

According to the invention, there is provided an optical amplifier for amplifying the channel signals of a WDM signal, comprising an amplifier arrangement for amplifying a band of the channels, the amplifier arrangement comprising an amplifier and a filter, the filter comprising a controllable optical filter having an attenuation characteristic which comprises a region of positive gradient and a region of negative gradient with respect to input frequency, wherein the magnitude and alignment along the frequency axis of the attenuation characteristic is variable, such that the filter can be tuned to provide gain flattening for the amplified band of channels.

The filter design used in the invention can be tuned to the requirements of a particular sub-band, whilst identical filters can be used for each sub-band. This invention enables identical filters to be used, and gives good pump power efficiency, as the attenuation of each filter can be controlled to the desired level, thereby avoiding the need for large increases in pump power.

The attenuation characteristic is preferably periodic with input frequency, and the magnitude and phase of the attenuation characteristic is then variable. The amplifier may further comprise a first multiplexer arrangement between the fiber carrying the WDM signal and a plurality of signal carriers each carrying a respective band of channels, and a second multiplexer arrangement between the signal carriers for the bands and signal carriers for the individual channels, wherein each band is provided with an amplifier and an identical filter. Thus, identical filters can be used for different bands.

Each filter may comprise a sinusoidal filter, and may include an input wave guide, an output waveguide, a polarisation separation means, a variable polarisation rotation means, the variation being dependant on a first control input signal, and a birefringent element having variable birefringence, the variation being dependant on a second control input signal, wherein an optical input signal emitted form the input waveguide passes through the polarisation separation means, the variable polarisation rotation means and the birefringent element to the output waveguide so as to produce at the output waveguide an optical output signal having a frequency dependant output characteristic determined by the two control input signals.

The magnitude of the attenuation can be determined by the first control input signal and the phase of the attenuation can be determined by the second control signal.

The amplifier arrangement may comprise an Erbium doped fiber amplifier, or a plurality of such amplifiers.

According to a second aspect of the invention, there is provided a method of providing gain-flattened amplification of at least one band of channels of an optical WDM signal, comprising:

forming bands of channels;

amplifying at least one band of channels and applying filtering using a controllable optical filter having an attenuation characteristic which comprises a region of positive gradient and a region of negative gradient with respect to input frequency, wherein the step of applying filtering comprises setting the magnitude and alignment along the frequency axis of the attenuation characteristic, such that the filter is tuned to provide gain flattening for the amplified band of channels.

The step of forming bands of channels may comprise demultiplexing the channels from a fiber carrying the WDM signal (at a receiving node of a network) or it may comprise multiplexing the channels from individual transmitters for each channel (at a transmitting node of a network).

The invention may be used in a WDM optical communications system.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
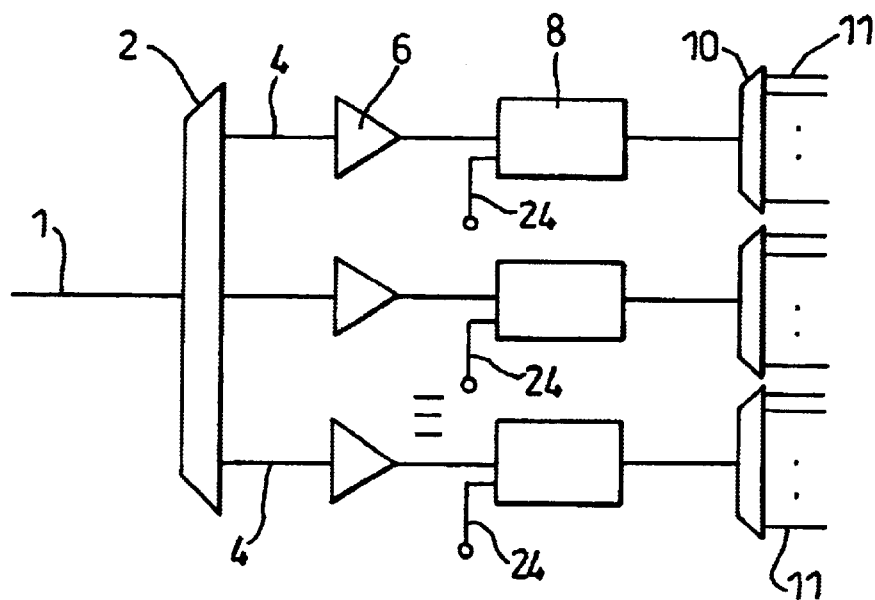
FIG. 1 shows an amplifier and demultiplexer according to the invention.

FIG. 1 shows an amplifier according to the invention for amplifying the channel signals of a WDM signal. For the purposes of explanation, the amplifier is shown at the receiving end of a transmission line, where the individual channels are being provided to respective receivers (not shown). The WDM signal is carried by a fiber 1, and a demultiplexer 2 divides the channels on the fiber into sub-bands 4 of channels. For example, there may be 48 WDM channels carried by the fiber, and these may be divided into six bands of eight channels by the demultiplexer 2.

At the sub-band level, dispersion compensation and power management operations may be performed, although these are not represented in the FIG. Each sub band 4 is associated with an amplifier 6 and a filter 8. Amplification is provided on the sub-band level (rather than at the fiber level) so that the amplification compensates for losses in the demultiplexer 2.

The invention enables the amplifiers 6 and the filters 8 for each sub-band 4 to be identical, but with the filter loss tailored to the specific sub-band of channels. The filters provide a gain flattening function over the sub-band of channels. The filter outputs are supplied to a further demultiplexer 10 which derives the individual channels 11 which are supplied to respective receivers.

The amplifier and filter arrangement may also be used at the transmitting node, before the channels are combined on the fiber. Similarly, add/drop nodes may also employ banded channel amplification using the amplifier configuration of the invention.

The amplifier may amplify all bands of channels, in which case an amplifier 6 and identical filter 8 will be provided for each band. However, the amplifier may be part of a node which transmits and receives only on selected wavelengths. In this case, the node may only require a smaller number of the bands to be amplified, for example only for the channels to be transmitted or received by the node, or the channels to be added or dropped at the node. However, an identical amplifier and filter arrangement can be used in different nodes of the network to provide gain flattened amplification of different bands. Essentially, the amplifier arrangement will be used at locations within the network where there are multiplexing operations, and for the demultiplexed bands of channels.

Figure 2:
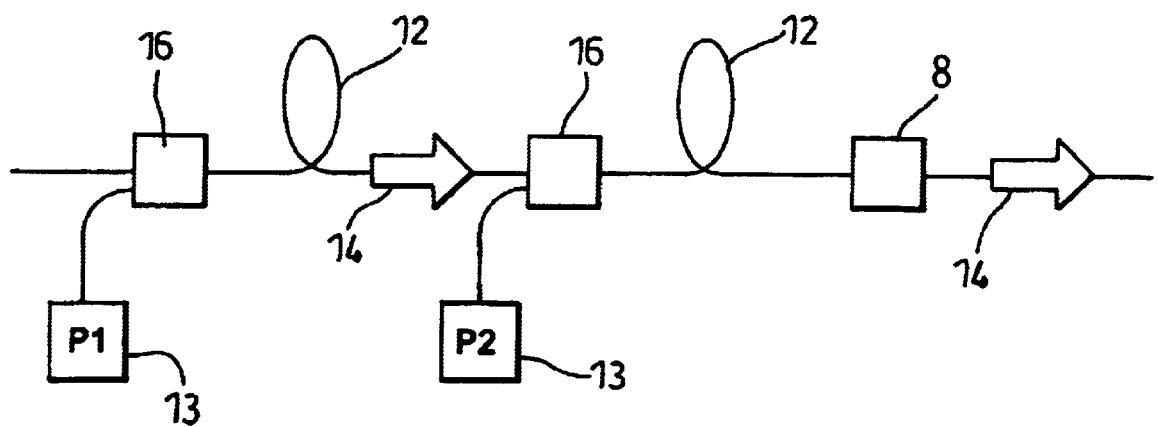
FIG. 2 shows in greater detail the amplifier and filter for one sub-band of channels.

FIG. 2 shows in greater detail the amplifier and filter combination of one sub-band of channels. The amplifier arrangement is one example only. A two stage amplifier is shown, each stage being co-pumped by a respective pump source 13. Each stage comprises a length of Erbium doped fiber 12, an isolator 14 and an optical coupler 16 for introducing the pump power to the fiber. The amplifier arrangements do not have a flat gain response, even over the relatively narrow wavelength range of the sub-band of channels. Furthermore, the gain response curve of the amplifier varies not only with frequency but also as a function of the gain setting of the amplifier. Consequently, if different gain settings are required, different filter characteristics are desirable to provide suitable gain flattening.

Each filter 8 is an electronically controllable optical filter having control inputs 24. The filters have an attenuation characteristic which varies with input frequency, particularly having a loss characteristic which includes a positive gradient portion and a negative gradient portion, with respect to frequency. The control inputs 24 enable the magnitude and phase (i.e. the position of the loss characteristic along the wavelength axis) of the attenuation characteristic to be varied. This enables each filter to be tuned to provide gain flattening for the amplified associated band of channels. In particular, the loss characteristic can be selected to have a positive or negative gradient with respect to frequency, and also to provide an appropriate overall level of attenuation so that the amplification or signal intensity of the different sub-groups of channels is the same.

This arrangement enables identical filters 8 to be used, which reduces the cost of implementing the amplifier. In the following description, each sub-group of channels is taken to comprise four channels. This is for the purposes of explanation only, and a different number may be appropriate.

The filter loss characteristic may have a single lobe, although a more practical implementation of the filter 8 has a periodic loss characteristic as a function of wavelength, for example a sinusoidal response. This gives the response a maxima and a minima. The filter adjustment enables the amplitude and phase of the loss characteristic to be controlled.

The manner by which the filter control enables gain flattening to be achieved for a band of channels will now be explained, with reference firstly to FIG. 3, which shows the unflattened gain response of an Erbium doped fiber amplifier for a number of groups of four channels and for a different gain setting of the amplifier. Plots 30 represent the gain provided by an Erbium amplifier to the individual channels (spaced 1 nm apart for this example), when there is no gain flattening, and the gain level of the amplifier is controlled to provide 15 dB gain (as an average for all four channels). Plots 32 represent the gain provided by an Erbium amplifier to the individual channels when the gain level of the amplifier is controlled to provide 12 dB gain (as an average for all four channels).

Figure 3:
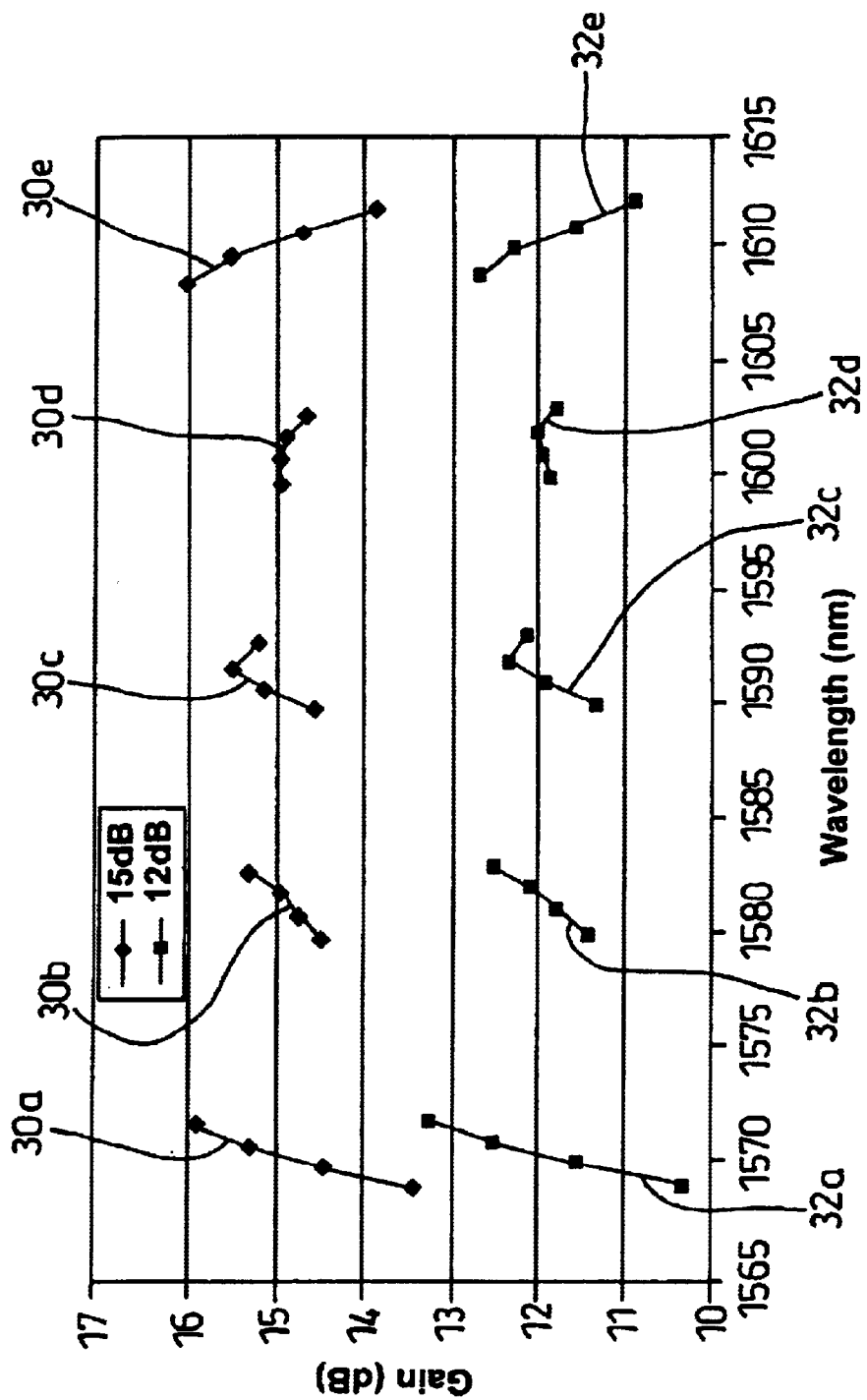
FIG. 3 shows the unflattened gain response of an Erbium doped fiber amplifier for a number of groups of channels and for a different gain setting of the amplifier.

It can be seen from FIG. 3 that the gain response is not only a function of the input frequency, but also of the gain setting of the amplifier, as the shape of the plots (as well as the position) changes when the gain is changed.

Figure 4A:
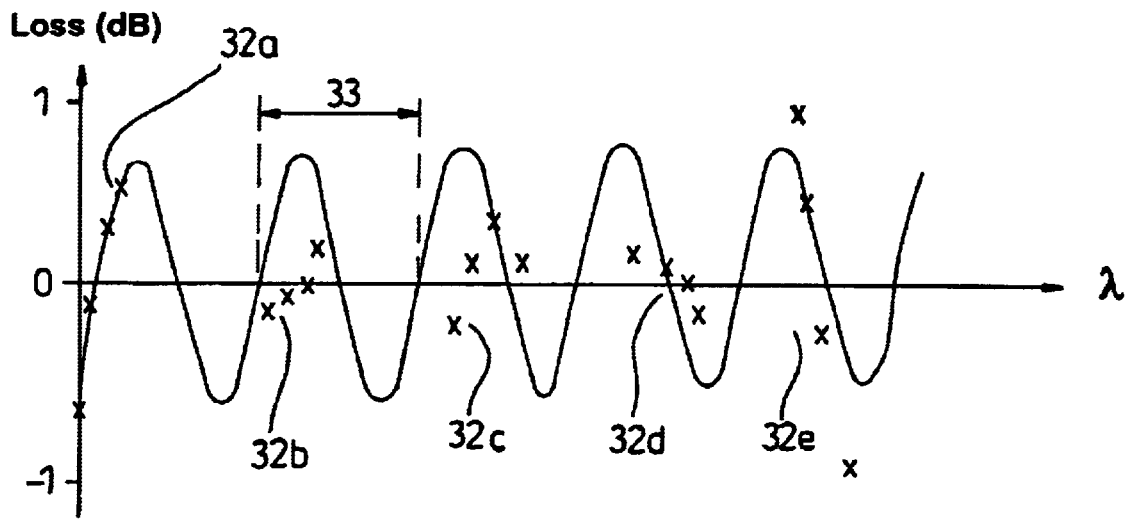
FIG. 4A shows how the filters in the amplifier of the invention are tuned to one Erbium amplifier response.
Figure 4B:
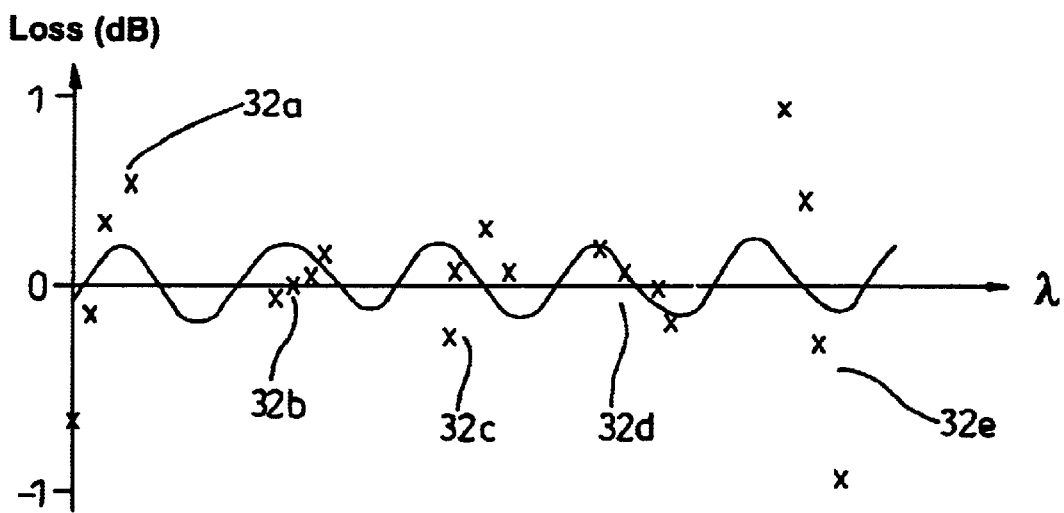
FIG. 4B shows how the filters in the amplifier of the invention are tuned to another Erbium amplifier response.

In the preferred embodiment, the filters of the invention provide a periodic and sinusoidal gain profile, as mentioned above. FIGS. 4A and 4B show how this sinusoidal gain profile can be tuned to the Erbium amplifier response, when the amplitude and phase can be adjusted. FIG. 4A shows a sinusoidal loss curve matched to the plot 32a. By providing increased filter loss at the wavelengths where larger gain is applied, the output gain can be flattened. Thus, the amplitude of the sinusoidal variations and the phase is controlled so that the four points of plot 32a map onto the sinusoidal curve, as shown. FIG. 4B shows a sinusoidal loss curve matched to the plot 32d in the same way.

The period 33 of the loss characteristic (measured in wavelength units) is selected as a function of Erbium response of FIG. 3, so that the best matching of the loss characteristic to the Erbium response can be achieved for the bands of channels to which the filter is to be tuned.

The filtering devices for use in amplifier of the invention may take a number of forms, and simply require an output having positive and negative gradient slopes. One example of a suitable filter comprising an electronically controllable optical filter device will now be described in detail.

Figure 5:
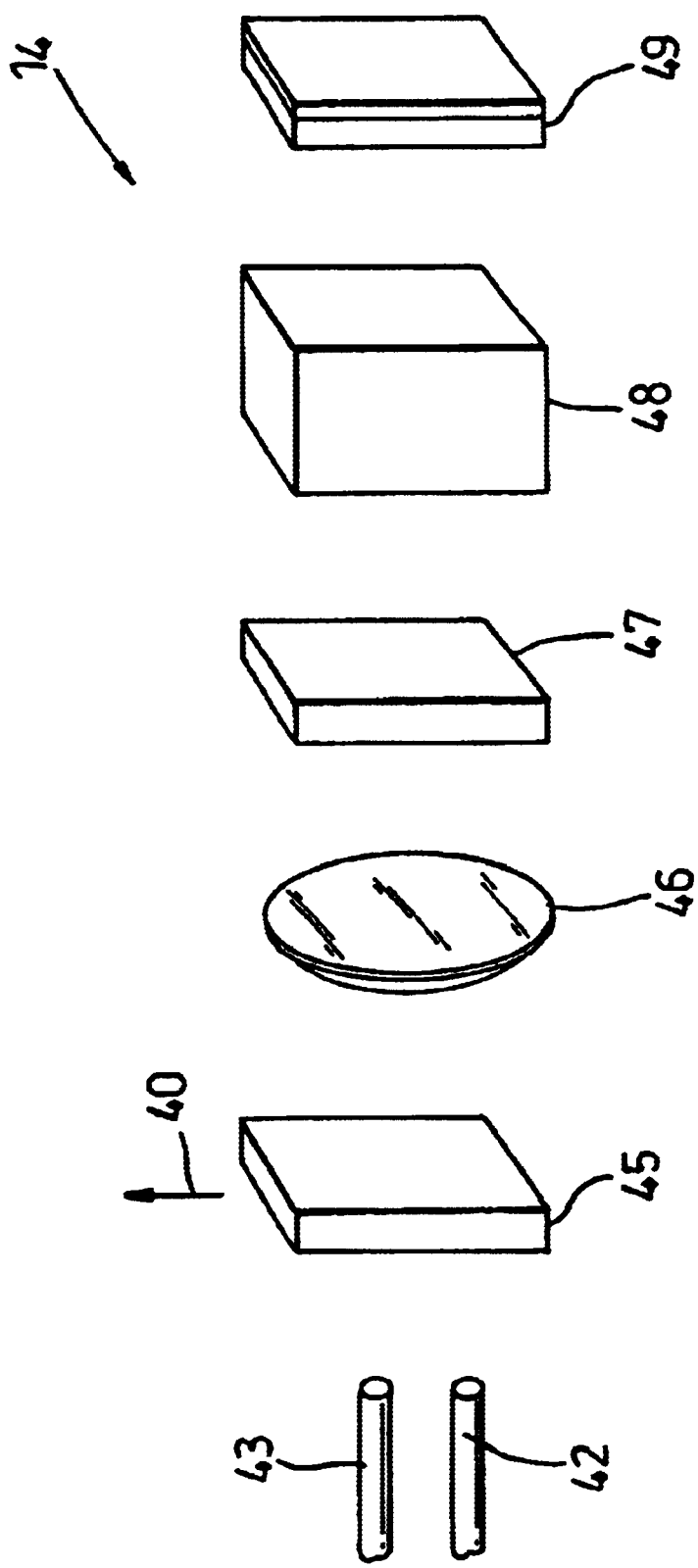
FIG. 5 shows a simplified exploded perspective of one possible filter for use in the amplifier of FIG. 1.

Turning to FIG. 5, there is illustrated an exploded perspective (in schematic form) of the filtering device 14. The filtering device includes input/output optical fibre waveguides 42, 43 with the light from input waveguide being projected through a series of elements including walkoff crystal 45, lens 46, Faraday rotator 47 and a birefringent crystal 48. The emitted light is reflected by a mirror 49 so as to return again through the elements 48 to 45.

As will become more evident hereinafter, the walkoff crystal 45 translates one of the polarisation states in the direction 40. The Faraday rotator provides a non-reciprocal rotation of the polarisation states depending on the strength of an external magnetic field (not shown). The birefringent crystal 48 provides a rotation of the polarisation state depending upon the thickness. The thickness is controlled by a thermal electric cooler (not shown), otherwise known as a Peltier device. Alternatively, a Pockel's cell can be utilised in place of the thermal electric coder which provides a variable birefringence dependent upon the strength of an external electric field.

Figure 6:
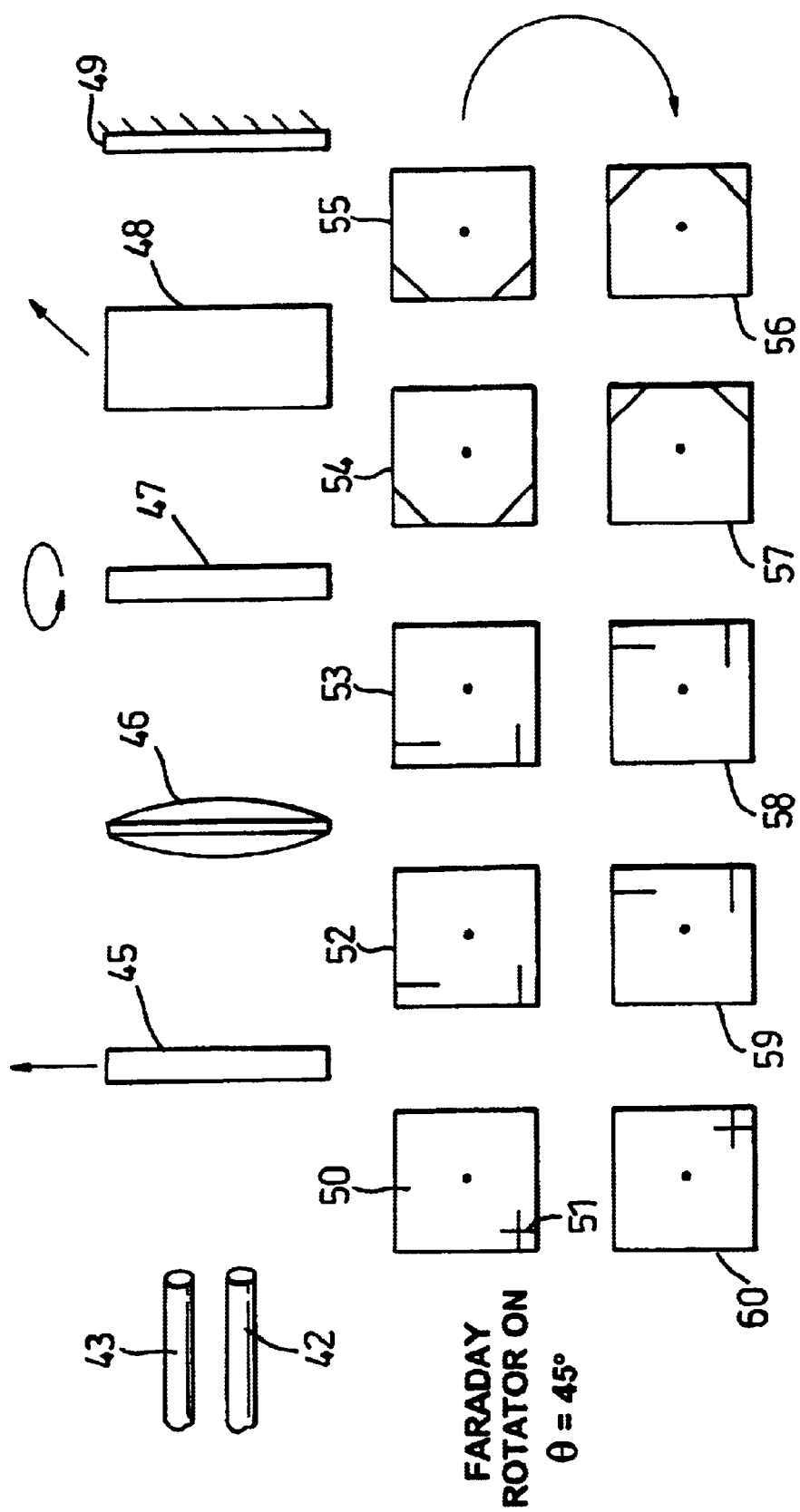
FIG. 6 illustrates a series of polarisation state transition diagrams.

Turning now to FIG. 6, there is initially illustrated a series of polarisation state diagrams e.g. 50 for the arrangement of FIG. 1 when the Faraday rotator is activated so as to provide a non-reciprocal rotation of 45°. Initially, the polarisation states are spatially aligned at location 51. After traversing the walkoff crystal 45, one of the polarisation states is translated relative to the other so as to separate the polarisation states as shown at 52. The lens 46 acts to focus the outgoing and return beams and has no effect on the polarisation state as shown at 53. The Faraday rotator 47 provides for a 45° rotation of each of the polarisation states as shown at 54. The birefringent crystal 48 is oriented at 45° and delays one orthogonal polarisation relative to the other. However, as the birefringent crystal 48 is oriented at 45°, it has no effective consequence on the polarisation states at 55.

The mirror 49 inverts the polarisation states (at 56) before they again pass through the birefringent crystal 48 which has no effect (at 57). The Faraday rotator 47 provides a 45° rotation of the polarisation states (at 58). The lens 6 again has no effect (at 59) on the polarisation states. Finally, the walkoff crystal 45 aligns the polarisation states as shown in plot 60 for output to the fibre 43. Hence, the net result when the Faraday rotator is providing a 45° non-reciprocal rotation is a transfer of the emitted light from the fibre 42 to fibre 43 independently of wavelength.

As noted previously, the birefringent crystal 48 delays one of the polarisation states with respect to the other. The amount of delay will be dependant upon the thickness of the birefringent crystal and the wavelength.

Figure 7:
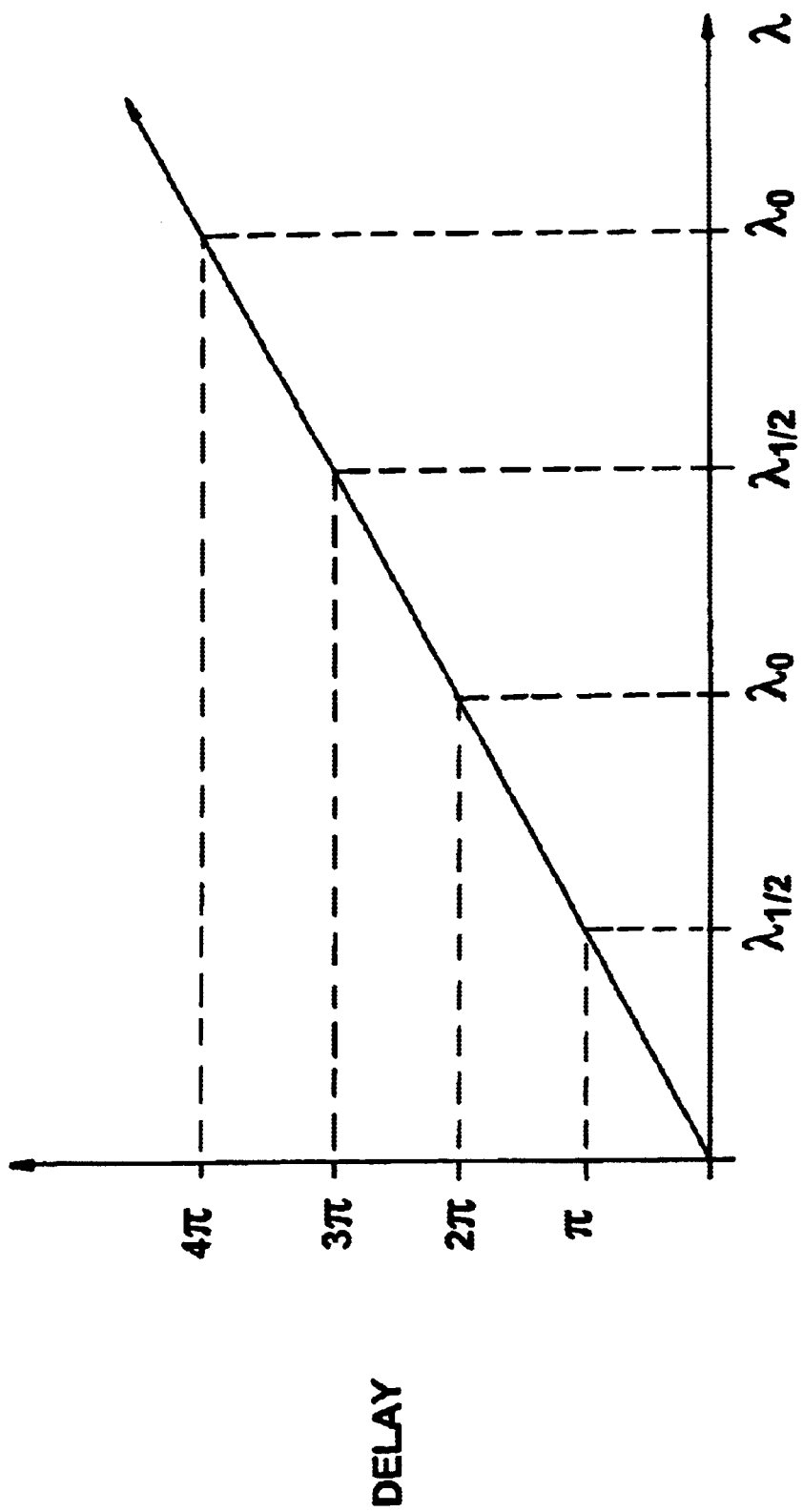
FIG. 7 illustrates the phase delay of the birefringent crystal with respect to wavelength.

Turning now to FIG. 7, there is provided for the purpose of illustration, an example graph of the phase delay of the birefringent crystal with respect to wavelength. The arrangement of FIG. 6 is for the total phase delay in traversing the birefringent crystal in both the out and return modes.

The degree of phase delay will be somewhere between 0 and $2\pi$ as the wavelength increases. The wavelength corresponding to each $2\pi$ phase delay is denoted $\lambda_0$ with the phase delay for an "out of phase" rotation of the phase being denoted $\lambda_{1/2}$. The apparent phase delay will vary between 0 and $2\pi$ in accordance with wavelength, Further, if the properties of the birefringent crystal are changed, then the $\lambda_0$ and $\lambda_{1/2}$ points will be correspondingly varied on the wavelength scale. The variable phase delay between orthogonal polarisation states can be utilised to provide for a wavelength dependant sinusoidal extinction of an input signal.

Figure 8:
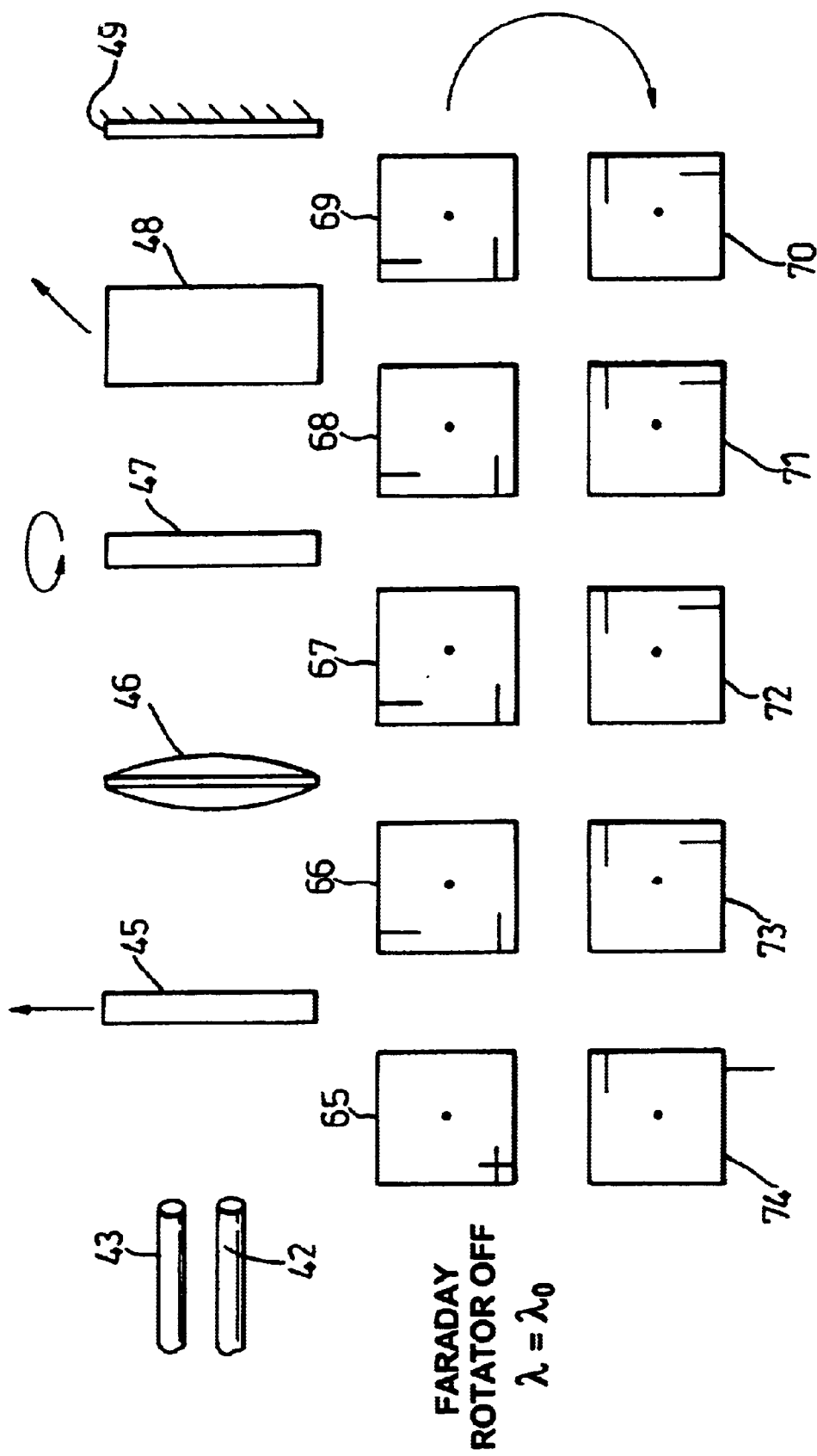
FIG. 8 illustrates a series of polarisation state transition diagrams.

Turning now to FIG. 8, there is illustrated a series of polarisation state diagrams e.g. 65 for the case where the Faraday rotator is turned off and when $\lambda$ corresponds to the $\lambda_0$ state of FIG. 7.

Initially, the polarisation states are spatially aligned as they are emitted from the fibre 42. Next, the walkoff crystal 45 provides for a separation 66 of the polarisation states which are unaffected 67 by the lens elements 46. The Faraday rotator 47 is turned off so it also has no effect 68 on the polarisation state.

At the position $\lambda=\lambda_0$ each traversal of the birefringent crystal 48 provides for a $\pi$ or $2\pi$ phase delay and hence, the double traversal ($2\pi$ or $4\pi$) has no effect on the polarisation state 71. Polarisation state 69 can either be unchanged ($2\pi$ phase delay) or rotated by 90° ($\pi$ phase delay). The mirror 49 reflects the polarisation states 70 where they are again delayed by the factor $\pi$ or $2\pi$. The Faraday rotator 47 is turned off so it has no effect 72 on the polarisation state nor does the lens 46 (at 73). The walkoff plate 45 further separates the polarisation states 74 such that they are no longer aligned with the fibre 43.

Hence, the overall result in the arrangement of FIG. 8 is that the device of FIG. 5 acts as an attenuator.

Figure 9:
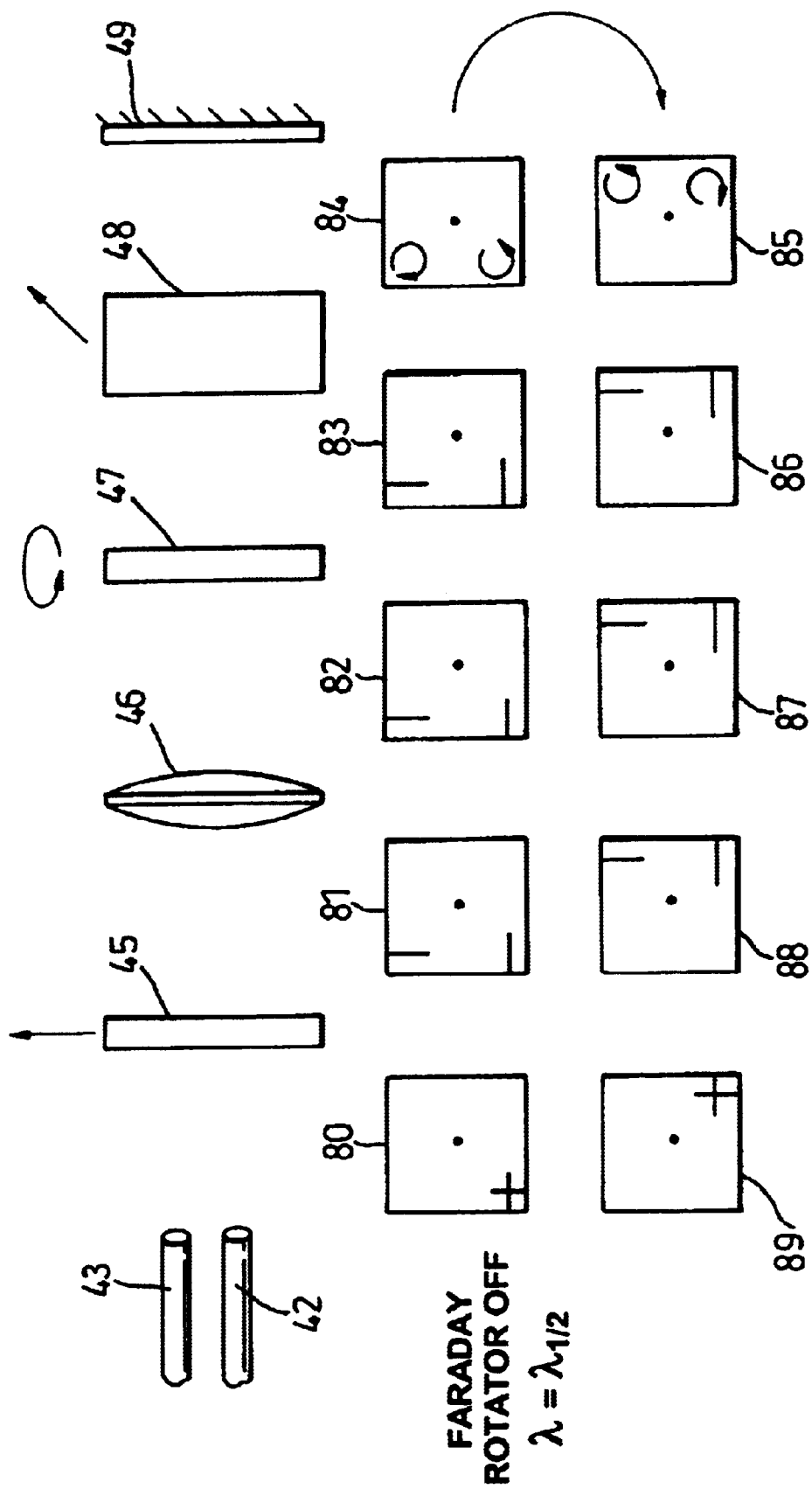
FIG. 9 also illustrates a series of polarisation state transition diagrams.

Turning now to FIG. 9, there is illustrated a series of polarisation state diagrams 80–89 for the case where the Faraday rotator is off at the wavelength $\lambda_{1/2}$ of FIG. 7. Initially, the polarisation states are aligned 80 and they are again separated 81 by the walkoff crystal 45. The lens 46 has no effect on the polarisation state 82 and the Faraday rotator 47, which is turned off, also has no effect on the polarisation state 83. In the case where $\lambda=\lambda_{1/2}$ each traversal of the birefringent crystal 48 acts as a quarter wave plate delaying the phase of orthogonal polarisation states relative to one another. Hence, after the first traversal of the birefringent crystal 48, the polarisation state 84 will comprise two oppositely oriented elliptical polarisation modes. The mirror 49 results in an inversion 85 of the polarisation states.

The second traversal of the birefringent crystal 48 results in the output polarisation states 86 which are unaffected 87 by the Faraday rotator 47. The lens 46 again does not affect the polarisation states 88. Finally the walkoff crystal 45 aligns the polarisation states 89 where they are emitted to output fibre 43.

By examining the output polarisation states 74 and 89 of FIG. 8 and FIG. 9, it can be seen that as $\lambda_1$ goes from $\lambda_1$, to $\lambda_0$ and the Faraday rotator is off, the arrangement of FIG. 5 goes from acting as a full pass filter to acting as an attenuator. Further, as illustrated in FIG. 6, when the Faraday rotator is on, the device again acts as a full pass filter.

Figure 10:
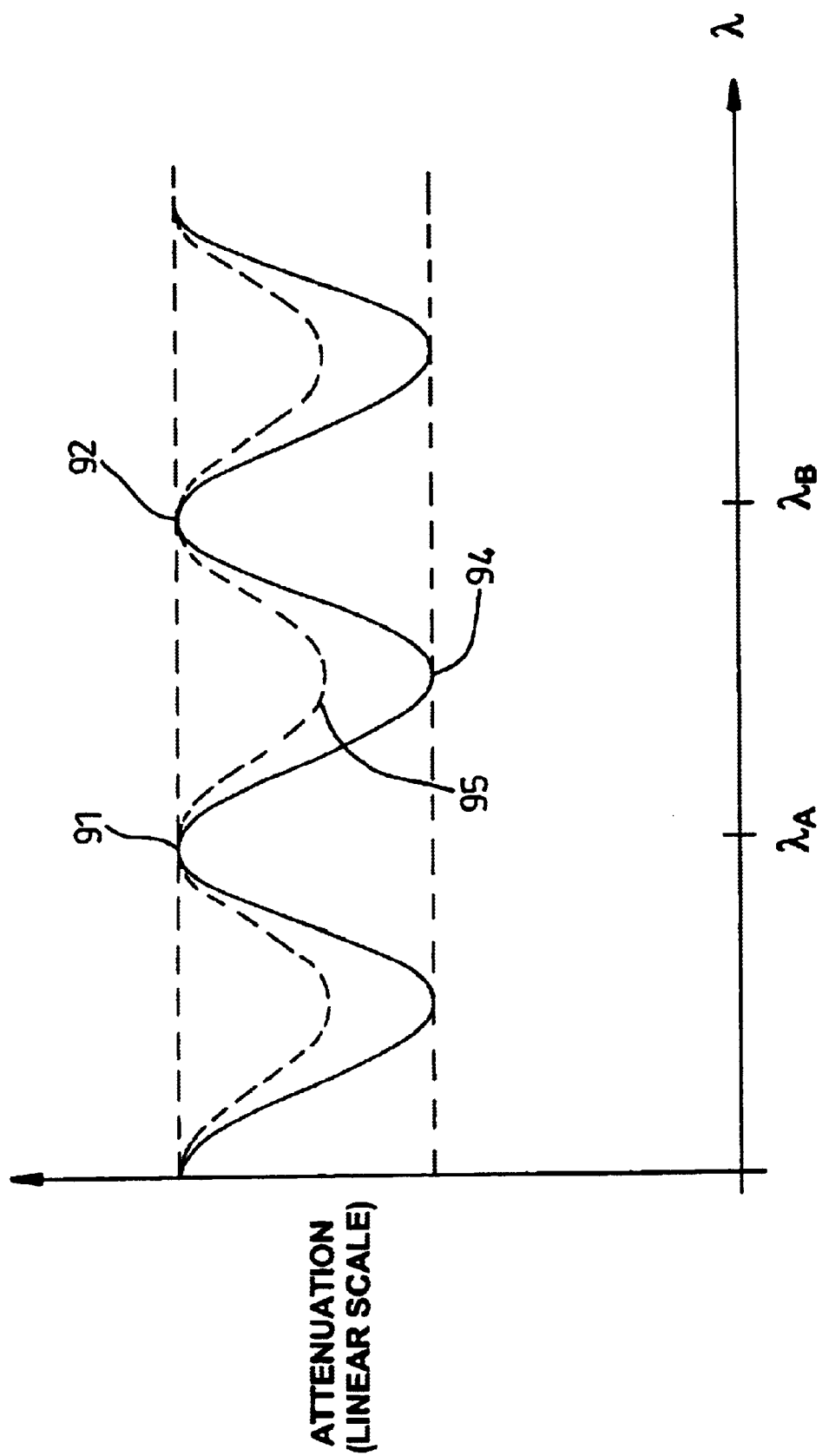
FIG. 10 illustrates the overall operation of the filter.

The net operational characteristics of the device will therefore be as illustrated in FIG. 10 which shows a graph of device attenuation with respect to wavelength. As shown, the device provides the required periodic attenuation characteristics, in sinusoidal form.

The position of the peaks e.g. 91, 92 having wavelengths $\lambda_A$ and $\lambda_B$ (corresponding to $\lambda_{1/2}$ in the arrangement of FIG. 6) will be determined by the thickness and birefringence of the birefringent crystal. Hence, if a thermal electric cooler (otherwise known as a Peltier device) is attached to the birefringent crystal 48 so as to provide for controlled thermal expansion and birefringence, the position of the peak 91, 92 can be accurately controlled. Alternatively, a Pockel's cell device can be utilised which allows for the birefringence to be controlled by an electric field.

Thus, the birefringent crystal is controlled to provide the phase control of the attenuation characteristics of the filter.

The degree of attenuation e.g. 94, 95 is determined by the operation of the Faraday rotator 47. Upon a Faraday rotation of 45°, very low levels of attenuation are achieved. With the Faraday rotator off, higher levels, 94 of attenuation are achieved. The Faraday rotator can be placed in an external magnetic field with the degree of rotation being proportional to the strength of the magnetic field. Alternatively the direction of the magnetic field can be controlled. Hence, to control the degree of attenuation, the magnetic field is altered in accordance with requirements, to provide the required control of the magnitude of the attenuation characteristic.

The two control signals are applied to lines 24 of FIG. 1.

Although the arrangement of FIG. 5 illustrates a preferred form of filter, a number of modifications or variations are possible. For example, the mirror 49 can be dispensed with and the devices 45–48 replicated "on the other side of the mirror" so as to provide for the same effect. However, such an arrangement is likely to be more costly due to the duplication of parts. Further, an additional halfway plate may be provided after the walkoff crystal 45 so as to align the polarisation states, for example, at the stage 52 of FIG. 6. This may provide for reduced polarization mode dispersion at the cost of an extra parts and a different magnetic drive is required. Alternatively, a variable retardation plate can be utilised in place of the Faraday rotator.

The tunable filter described is polarisation independent, compact and utilises a low number of components due its reflective nature and hence can be constructed at a low cost.

Figure 11:
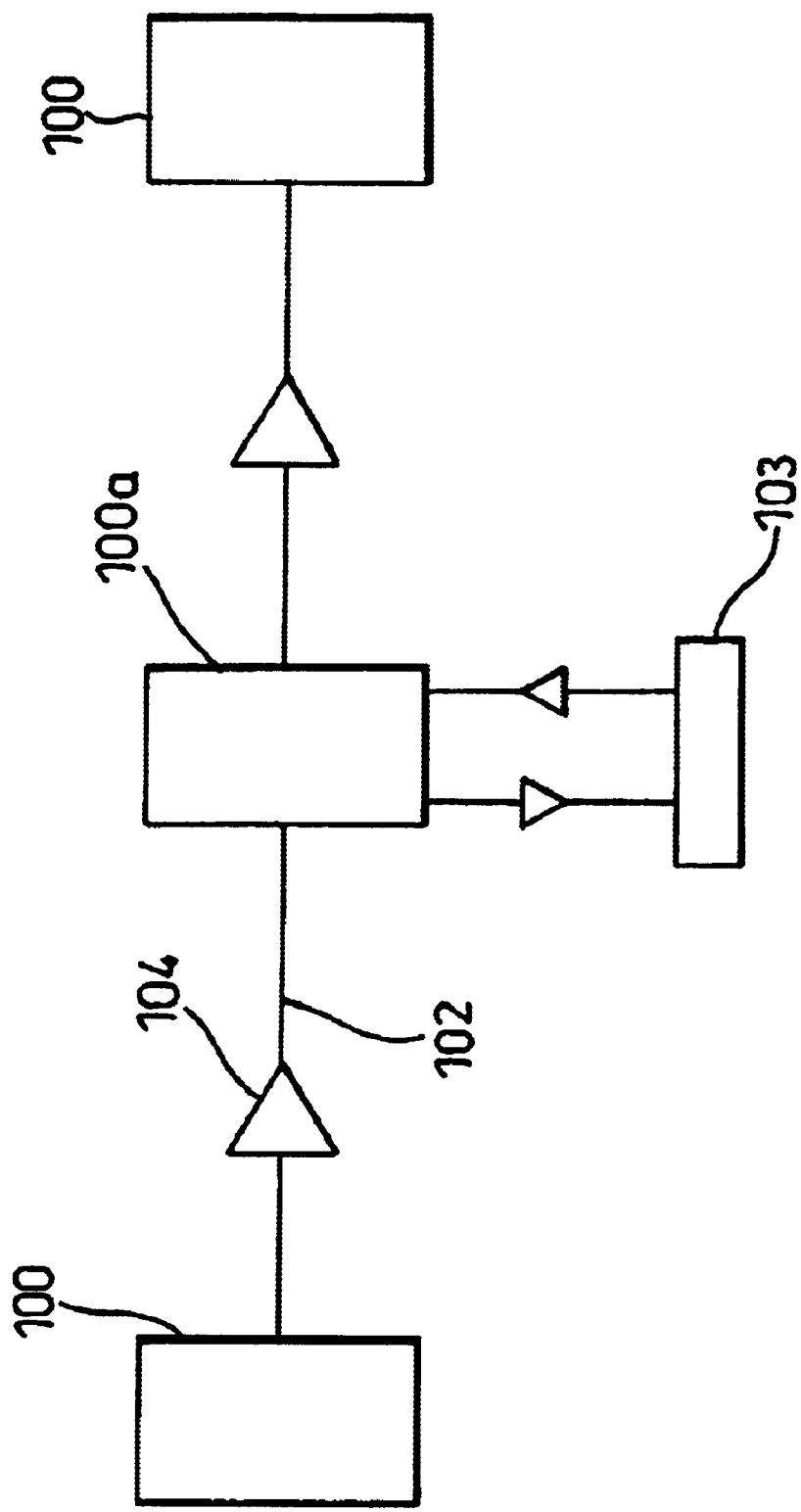
FIG. 11 illustrates schematically an incorporation of the amplifier of the invention into a communications system.

FIG. 11 shows a WDM optical communications system comprising a number of nodes 100 interconnected by optical fibers 102. The nodes provide routing functions as well as allowing the adding or dropping of signals at the node sites. For example, node 100a provides add and drop functions to a client unit 103. Optical amplifiers 104 are located along the fiber paths. The amplifier of the invention is provided at the multiplex and demultiplex sites, namely at the add/drop nodes and at the receive and transmit nodes. In addition to the arrangement of the invention for gain flattening, the nodes will include additional optical processing elements, such as for chromatic dispersion compensation, PMD compensation and power equalisation, and these operations may also be carried out on a per band level.

The filter design can be tuned according to the gain requirements of the amplifier. Thus, the filter tuning may be selected so that there is a match with either plots 30 or plots 32 of FIG. 2, depending on the amplifier gain setting.

The filter tuning can be performed at system build, or else it may be adjusted dynamically as the system requirements and configurations change. The amplifier arrangement does not require significant pump power increase and provides good noise performance, with excellent gain flatness.

The dynamic filters in the amplifier can be controlled to compensate for losses before and/or after the amplifier site. For example, in FIG. 1, the output of the filter is passed through a demultiplexer 10 which provides the individual channels 11. This demultiplexer may introduce a different loss to different wavelengths, and the filter may be tuned to take account of this, so that the gain flattening takes account of the demultiplex operation. This provides a pre-emphasis compensation function, which can provide further power management and loss balancing in a system.

One specific design of dynamic filter has been given. Further details can be found in the article OFC2000 Technical Digest- Paper WM14 (p251–253) "Low loss polarisation-independent dynamic gain-equalisation filter". However, other filter designs may be used. For example, the article "Tunable Gain Equalization Using a Mach-Zehnder Optical Filter in Multistage Fiber Amplifiers", IEEE Photonics Technology Letters, Vol. 3, No. 8., August 1991, Kyo Inoue et al, discloses a waveguide Mach-Zehnder filter. This filter design may also be adapted for use in the amplifier of the invention. This paper is incorporated herein by way of reference material.

Although the broadband amplifier has been described as an Erbium amplifier, the invention may be applied to any other broadband amplifier.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. An optical amplifier for amplifying the channel signals of a WDM signal, for use in a system comprising a first multiplexer arrangement between at least one signal carrier carrying the WDM signal and a plurality of signal carriers each carrying a respective sub-band of channels comprising 2 to 8 channels, said amplifier comprising at least first and second amplifier arrangements for amplifying respective first and second sub-bands of channels, the amplifier arrangements each comprising an amplifier and a filter for filtering the respective sub-band of channels, the filter comprising a controllable optical filter having an attenuation characteristic which comprises a region of positive gradient and a region of negative gradient with respect to input frequency, wherein the magnitude and alignment along the frequency axis of the attenuation characteristic is variable, such that the filter can be tuned to provide gain flattening for the amplified sub-band of channels.

2. An amplifier according to claim 1, wherein the attenuation characteristic is periodic with input frequency, and the magnitude and phase of the attenuation characteristic is variable.

3. An amplifier according to claim 1, wherein each filter comprises a sinusoidal filter.

4. An amplifier according to claim 3, wherein each filter includes:

an input wave guide;

an output waveguide;

a polarisation separation means;

a variable polarisation rotation means, the variation being dependant on a first control input signal; and a birefringent element having variable birefringence, the variation being dependant on a second control input signal, wherein an optical input signal emitted form the input waveguide passes through the polarisation separation means, the variable polarisation rotation means and the birefringent element to the output waveguide so as to produce at the output waveguide an optical output signal having a frequency dependant output characteristic determined by the two control input signals.

5. An amplifier according to claim 4, wherein the magnitude of the attenuation is determined by the first control input signal and the phase of the attenuation is determined by the second control signal.

6. An amplifier according to claim 4, wherein the input and output waveguide have ends which are spaced apart at a first end of the filter, and the filter further includes a reflection element spaced at a second end of the filter such that the polarisation separation means, the variable polarisation rotation means and the birefringent element are between the reflection element and the waveguides, such that light emitted from the input waveguide passes through the polarisation separation means, the variable polarisation rotation means and the birefringent element before being reflected by the reflection element so as to again pass through the birefringent element, the variable polarisation rotation means and the polarization separation means before being emitted towards the output waveguide.

7. An amplifier according to claim 1, wherein the amplifier comprises an Erbium doped fiber amplifier.

8. An amplifier according to claim 1, wherein the filter comprises a Mach-Zehnder optical filter.

9. A method of providing gain-flattened amplification of at least two sub-bands of channels of an optical WDM signal, comprising:

forming sub-bands of channels comprising 2 to 8 channels;

amplifying at least two sub-bands of channels and applying filtering to the sub-bands of channels using respective controllable optical filters having attenuation characteristics which comprise a region of positive gradient and a region of negative gradient with respect to input frequency, wherein the step of applying filtering comprises setting the magnitude and alignment along the frequency axis of the attenuation characteristics, such that the filters are tuned to provide gain flattening for the amplified sub-bands of channels.

10. A method according to claim 9, wherein the step of forming sub-bands of channels comprises demultiplexing the channels from a fiber carrying the WDM signal.

11. A method according to claim 10, further comprising demultiplexing the sub-bands of channels into individual channels for supply to receiving circuitry.

12. A method according to claim 9, wherein the step of forming sub-bands of channels comprises multiplexing the channels from individual transmitters for each channel.

13. A method according to claim 12, further comprising multiplexing the sub-bands of channels together onto the fiber carrying the WDM signal.

14. A WDM optical communications system comprising a plurality of nodes, each node being provided for transmitting and/or receiving at least two sub-bands of the WDM channels each sub-band comprising 2 to 8 channels, each node including optical amplifier arrangements for amplifying at least two of the respective sub-bands of channels, each amplifier arrangement comprising an amplifier and a filter for filtering the respective sub-band of channels, the filter comprising a controllable optical filter having an attenuation characteristic which comprises a region of positive gradient and a region of negative gradient with respect to input frequency, wherein the magnitude and alignment along the frequency axis of the attenuation characteristic is variable, such that the filters can be tuned to provide gain flattening for the amplified sub-bands of channels.

15. A system according to claim 14, wherein the attenuation characteristic is periodic with input frequency, and the magnitude and phase of the attenuation characteristic is variable.

16. A system according to claim 14, wherein each filter comprises a sinusoidal filter.

17. An amplifier according to claim 1, wherein each of the first and second amplifier arrangements is provided with an amplifier and an identical filter.

18. A WDM optical communications system according to claim 14, wherein each of the at least two amplifier arrangements is provided with an amplifier and an identical filter.

* * * * *